(12) United States Patent
Daehnert et al.

(10) Patent No.: US 9,128,369 B2
(45) Date of Patent: Sep. 8, 2015

(54) METHOD FOR APPLYING OPTICAL FILTER STRUCTURES ONTO A CARRIER SUBSTRATE

(75) Inventors: Ullrich Daehnert, Lengefeld (DE); Juergen Schwarz, Apolda (DE); Stephan Otte, Jena (DE)

(73) Assignees: Secco GmbH, Lengefeld (DE); 3D International Europe GmbH, Jena (DE)

( * ) Notice: Subject to any disclaimer, the term of this patent is extended or adjusted under 35 U.S.C. 154(b) by 966 days.

(21) Appl. No.: 13/319,003

(22) PCT Filed: Apr. 16, 2010

(86) PCT No.: PCT/EP2010/055049
§ 371 (c)(1),
(2), (4) Date: Jan. 17, 2012

(87) PCT Pub. No.: WO2010/127934
PCT Pub. Date: Nov. 11, 2010

(65) Prior Publication Data
US 2012/0111493 A1 May 10, 2012

(30) Foreign Application Priority Data
May 5, 2009 (DE) .......... 10 2009 019 761

(51) Int. Cl.
C03C 27/00 (2006.01)
B29C 65/02 (2006.01)
(Continued)

(52) U.S. Cl.
CPC . *G03C 7/12* (2013.01); *B29C 65/14* (2013.01); *B29C 70/504* (2013.01); *C08J 5/12* (2013.01);
(Continued)

(58) Field of Classification Search
CPC .............. C08G 59/68; C09J 5/06; C09J 4/00; C09J 5/00; C09J 7/00; C09J 2400/163; C09J 2463/00; C08L 63/00; F16B 11/006; G11B 7/26; C08J 5/12; B29C 70/086; B29C 70/34; B29C 70/504; B29C 65/14; B29C 65/48

USPC .......... 156/99, 106, 273.3, 295, 306.9, 307.1, 156/580, 582
See application file for complete search history.

(56) References Cited

U.S. PATENT DOCUMENTS

| | | | |
|---|---|---|---|
| 5,635,114 A * | 6/1997 | Hong | 264/1.33 |
| 7,697,105 B2 | 4/2010 | Koyama et al. | |
| 8,597,765 B2 * | 12/2013 | Iwase | 428/141 |
| 2002/0036055 A1 * | 3/2002 | Yoshimura et al. | 156/234 |
| 2003/0234980 A1 | 12/2003 | Montgomery et al. | |
| 2010/0118398 A1 | 5/2010 | Grau | |

FOREIGN PATENT DOCUMENTS

| | | |
|---|---|---|
| CN | 1930599 A | 3/2007 |
| CN | 101040222 A | 9/2007 |

(Continued)

OTHER PUBLICATIONS

English translation of DE19804150; Glueck et al. Dec. 8, 1999.*
(Continued)

*Primary Examiner* — Sonya Mazumdar
(74) *Attorney, Agent, or Firm* — Patterson Thuente Pedersen, P.A.

(57) ABSTRACT

A method by which optical filter structures may be applied onto a substrate that is transparent to light at least in the visible wavelength range suitable for a barrier filter.
In such a method, an adhesive is applied onto the substrate; then, a photographic film comprising a base film and a photographic emulsion layer applied on it is brought into contact with the adhesive. The optical filter structures are impressed in the photographic emulsion layer by exposure, development and fixation. The side of the film brought into contact with the adhesive is the one that bears the photographic emulsion layer. The adhesive is then spread between film and substrate by means of a roller rolling across the film at a specified contact pressure and a specified feed rate of the roller and thus pressing the film against the substrate. A permanent joint between substrate and photographic emulsion layer is then established by the curing of the adhesive. In a further step, the base film may be thermally separated and removed from the photographic emulsion layer.

20 Claims, 5 Drawing Sheets

(51) Int. Cl.
*B29C 65/52* (2006.01)
*B32B 17/06* (2006.01)
*B32B 37/06* (2006.01)
*B32B 37/10* (2006.01)
*B32B 37/12* (2006.01)
*G03C 7/12* (2006.01)
*C09J 5/06* (2006.01)
*C08J 5/12* (2006.01)
*B29C 65/14* (2006.01)
*B29C 70/50* (2006.01)
*C09J 5/00* (2006.01)
*G02B 5/20* (2006.01)
*B32B 17/10* (2006.01)
*B32B 37/15* (2006.01)
*B29C 65/48* (2006.01)
*B29C 70/08* (2006.01)
*B29C 70/34* (2006.01)

(52) U.S. Cl.
CPC .... *C09J 5/00* (2013.01); *C09J 5/06* (2013.01); *G02B 5/201* (2013.01); *B29C 65/48* (2013.01); *B29C 70/086* (2013.01); *B29C 70/34* (2013.01)

(56) References Cited

FOREIGN PATENT DOCUMENTS

| | | |
|---|---|---|
| CN | 101107339 A | 1/2008 |
| CN | 101218533 A | 7/2008 |
| DE | 19804150 A1 * | 8/1999 |
| DE | 102005030452 A1 | 1/2006 |
| DE | 102005031966 A1 | 1/2007 |
| EP | 0529092 A1 * | 2/1992 |
| JP | 08-136724 | 5/1996 |
| JP | 09-080215 | 3/1997 |
| JP | 2001159706 A | 6/2001 |

OTHER PUBLICATIONS

Chinese Office Action (and English Translation) for Chinese Patent Application No. 201080019998, dated Feb. 28, 2013, 11 pages.
German Examination Report dated Dec. 16, 2009, 5 pages.
Japanese Office Action for Japanese Patent Application No. 2012-508975, dated May 25, 2014, 3 pages.
Taiwanese Office Action for Taiwanese Application No. 099114164, dated May 13, 2013, 6 pages.

* cited by examiner

METHOD FOR APPLYING OPTICAL FILTER STRUCTURES ONTO A CARRIER SUBSTRATE

PRIORITY CLAIM

The present application is a National Phase entry of PCT Application No. PCT/EP2010/055049, filed Apr. 16, 2010, which claims priority from German Application Number 102009019761.3, filed May 5, 2009, the disclosures of which are hereby incorporated by reference herein in their entirety.

FIELD OF THE INVENTION

The invention relates to a method by which optical filter structures are applied onto a substrate that is transparent to light at least in the visible wavelength range.

BACKGROUND OF THE INVENTION

Filters that have a complex structure normal to the optical axis play an important part in many fields of optics. For example, so-called barrier filters are used to enable the viewer of a display screen to have a three-dimensional vision without further aids, provided that the picture contents to be displayed on the screen have been processed accordingly. Such filter structures can consist, for example, of an array, normal to the optical axis, of areas that are opaque and such that are transparent to light in the visible wavelength range, i.e. in a wavelength range from about 400 nm to 800 nm, arranged in a specified complex pattern. Areas that are transparent only to specified wavelengths or wavelength ranges are also feasible, just as are grid structures, although the latter are less used in connection with the implementation of three dimensional presentations.

These filter structures are commonly applied onto a substrate transparent to light. Glass or a suitable plastic are examples of eligible substrate materials.

First, the substrate is laminated with a cold laminating film on top. For this purpose, the cold laminating sheet is provided with an adhesive coating on its bottom side, which is joined with the glass substrate. The top side of the cold laminating sheet also has such an adhesive coating. On the latter, a photographic film is laminated as a next step. Alternatively one can do without the carrier sheet, using a single adhesive coating only.

Such a photographic film comprises, as a rule, a base film made, for example, of cellulose or polyester, and a thin layer that is at first sensitive to light, known as photographic emulsion layer, which is actually a suspension, i.e. a mixture of a liquid and solid matter dispersed in it, to be precise, a slurry of crystals finely dispersed in gelatin. Usually, the crystals are some silver halide, i.e. silver chloride, silver bromide or silver iodide. The photographic emulsion layer is then exposed to light so that a pattern corresponding to the complex optical filter structure is imaged on the film. This can be done, for example, with the aid of a prefabricated mask. Subsequently, the photographic filter is developed and fixed—as is common and long well-known in prior art—to make the optical filter structure impressed into the photographic emulsion layer permanently light-fast.

In the next step, the side of the film carrying the photographic emulsion layer is laminated to the adhesive coating of the cold laminating sheet. Thus one obtains a system of layers of glass-adhesive-cold laminating sheet-adhesive-photographic emulsion layer-base film.

The two laminating operations generally involve the risk that dust particles, fluff or other flaws such as, for example, air bubbles, get embedded into the photographic emulsion layer, which may lead to noticeable impairments of the optical action of the filter structure. In the worst case, this makes the filter unserviceable. Especially in case of large-area photographic films, the pressure of between 50 and 70 kPa that has to be applied for laminating, commonly by means of a roller or a cylinder, leads to a slight distortion or tensile strain of the film especially in the rolling direction. In the case of filter structures for screens for three-dimensional display, which feature a periodicity, this will impair the accuracy of periodicity, which may make such a filter unserviceable. This is because the optical filter structures have to be precisely matched to the pixel spacing of the display screen—as a rule, a liquid crystal display (LCD).

The method of fabrication described above causes problems also if several of these optical filter structures are applied onto the substrate simultaneously. Smaller structures can be used, for example, for the display screens of mobile phones, navigation systems or portable game consoles. If several filter structures are applied, for example, onto a glass substrate, the different filter structures need to be separated; i.e. the common glass substrate has to be cut, together with all other layers, from the base film to the cold laminating sheet to the lower adhesive coating. This can be done by means of suitable carbide-tipped glass cutters, but time and again this causes unforeseeable, irregular break edges and chips so that the entire, already manufactured optical filter has to be scrapped. Sometimes, the system of layers as a whole prevents clean separation and also causes sharp-edged fractures that not only make the product unfit for further use but also involve a severe risk of injury. It is known that operators, even though they wear gloves, frequently get their fingers cut.

Printing the optical filter structures onto the glass surface as an alternative fabricating method is unsuccessful, as the filter structures will not properly adhere to the optically smooth glass surface. The screen printing process will not produce optical structures of the necessary smallness and accuracy either. Structure edges and corners will flow out due to the surface tension of the viscous glass inks before curing or heat-fusing.

SUMMARY OF THE INVENTION

A feature and advantage of embodiments of the invention is that it permits a simple and reliable application of the optical filter structures onto a substrate, and that, in addition, is less susceptible to faults and easier to handle.

An embodiment of the invention is a method by which optical filter structures are applied onto a substrate that is transparent to light at least in the visible wavelength range, by way of the following process steps: First, an adhesive is applied onto the substrate. Subsequently, a photographic film is brought into contact with the adhesive. The photographic film comprises a base film and a photographic emulsion layer applied on it; the photographic emulsion layer already contains the optical filter structures produced by exposure, development and subsequent fixation. The side of the film carrying the photographic emulsion layer is then brought into contact with the adhesive.

The adhesive may be applied in just one position of the substrate, in a quantity sufficient to join the entire photographic film to the substrate. Alternatively, the adhesive may be distributed over an area that approximately equals the area of the film to be joined to the substrate.

In embodiments of the invention, the adhesive is then spread between film and substrate, in such a way that the film is pressed against the substrate by moving a roller across the film at a specified contact pressure and a specified feed rate of the roller. In this way, the adhesive, e.g., a viscous liquid having the viscosity of runny honey, is spread slowly; both the surface of the substrate, which may, for example, be glass, and the photographic emulsion layer on the film are wetted with the spreading adhesive.

In embodiments of the invention, a low feed rate may be selected so that any air trapped in the adhesive in the form of small bubbles can diffuse to the surface and disappear. Before the adhesive is applied, one must of course make sure that both the surface of the substrate and that of the photographic emulsion layer are free of impurities such as dust or other particles, scratches or other flaws such as air bubbles or other forms of trapped air, as otherwise the optical action of the filter structures can be spoiled.

In embodiments of the invention, the contact pressure exerted by the roller onto the film during its rolling movement across the glass plate must not be excessive, or else tensile strains and elongations of the elastic base film may result, especially with larger film formats and especially in the rolling direction, leading to changes of the regular spacing in the optical filter structures, which can substantially impair the desired three-dimensional effect. On the other hand, the contact pressure must not be too weak, since the adhesive then would not be spread uniformly and the thickness of the adhesive layer between substrate and photographic emulsion layer could become too great. Ideally, the adhesive layer should have a thickness between 10 μm and 30 μm.

In addition, contact pressure and feed rate are determined as a function of temperature, which influences the viscosity of the adhesive, and of the properties of the adhesive selected. In a range around room temperature, i.e. approx. 20° C., the invented method prefers a contact pressure between 1 and 20 kPa—i.e., substantially lower than customary in prior art—and a feed rate of the roller between 0.5 and 20 mm/s, with special preference of less than 10 mm/s, for example, 3 mm/s, with contact pressure and feed rate also being matched to each other. With these levels, or within these ranges, excellent results with regard to the above requirements can be achieved. Where temperatures deviate from room temperature, adaptations may be needed that result in levels outside the ranges mentioned.

Instead of a roller, it is possible to use a rigid (non-rotating) cylinder or another means of pressing to essentially the same effect. This requires for the means of pressing to be given a feed simultaneously with a contact pressure, and for the contact pressure to be exerted essentially along a line at right angles with the feed direction or within an area about this line, perhaps (depending on the shape of the means of pressing) with a contact pressure drop at either side of this line. For example, a slider can be used, which may have the shape of a ruler. A slider having a triangular cross-sectional area—an area in parallel with the feed direction—may also be used, with the slider resting on one of its flat sides or on one of the edges of the triangle, preferably an edge at which two legs of the triangle enclose an obtuse angle. The cylinder or roller may also have a very small diameter such as a wire, provided that a sufficiently high contact pressure can be exerted.

In embodiments of the invention, a feed rate of about 3 mm/s has proven especially suitable. In this case, firstly, the feed rate is still high enough to spread the adhesive between the substrate and the photographic emulsion layer across the entire area within an appropriate time, i.e. to apply the film completely onto the substrate. Secondly, the feed rate is low enough to ensure that any trapped air is removed all but completely.

In the next step, curing of the adhesive establishes a permanent joint between substrate and photographic emulsion layer. "Permanent" means the usual working life of such an adhesive joint under normal use conditions rather than under extreme conditions of temperature, humidity, etc. If the adhesive is, for example, water-soluble, and if the joint is undone by immersing the joined system in water, the joint is still to be regarded as permanent, as immersion in water is not to be considered normal use. Curing can be effected in various ways, varying especially with the adhesive used. One can use, for example, multiple-component adhesives, which cure in a natural way, e.g. due to heat, after the film has been applied. The preferred adhesive, however, is a liquid or viscous adhesive that cures under irradiation with ultraviolet (UV) light. Especially preferred are adhesives based on monomers that polymerize—i.e. that get linked to form polymers—under UV action.

The joined system made in this way can be used as is, where time and cost saving is a priority. As no cold laminating sheet is applied, better separation into smaller units is possible compared to prior art. Still better results—also with regard to the accuracy of the filter effect—can be achieved, though, if the base film is also removed, which is not readily possible, though.

In an optional last step, therefore, the base film is separated and removed from the photographic emulsion layer by a thermal process. The temperature has to be selected so as to ensure that, on the one hand, the base film heats up well enough to allow its removal without residue from the gelatin layer that forms the essential constituent of the photographic emulsion layer. On the other hand, the gelatin layer itself should be heated as little as possible, because if it is heated up too much, it may get destroyed during the removal of the base film.

For heating, one can use, e.g., a heating means in the form of a hotplate that radiates heat with an evenly distributed temperature. This hotplate is used for the simultaneous heating of the entire base film; the distance between the heat-radiating hotplate and the base film is selected as a function of the temperature of the hotplate and the thickness of the base film or the thermal properties of its material. The base film must heat up to such a level that it can be detached, whereas the photographic emulsion layer, mainly consisting of a gelatin layer, remains in place. This layer may, at the most, heat up in a very thin surface zone so as to become elastic in this zone without getting damaged when the base film is stripped off. The joined system and the hotplate may, in this case, be arranged in fixed positions relative to each other, but a relative movement between them may also be provided for.

In an embodiment of the invention that facilitates the removal of the base film, thermal separation of the base film from the photographic emulsion layer is effected by a heating means that has a surface area radiating heat towards the base film and is guided across the base film at a specified distance and a specified speed. The heating means may be, for example, a heating rail or a heating wire; it need not irradiate the entire film area at a time. The speed at which the heating means is moved across the base film is a function of the temperature of the heating means, the distance of the heating means from the base film and the thermal properties of the base film. What counts is only the relative movement between heating means and base film; in an equivalent way, then, the heating means may be stationary and the substrate be moved past the heating means. If the method is run semiautomatically or fully automatically, the version described last is the preferred one, in fact, since all process steps can be integrated in a single arrangement and the substrate can be transferred through corresponding operation stations in the way of an assembly line.

Instead of a hotplate, one can use a planar radiation source emitting infrared radiation, or an array of many small radiation sources of such kind, e.g., an array of infrared radiation sources. This provides higher reliability of separation.

The separation or detachment of the base film, which is, as a rule, between 100 and 180 µm thick, results in several advantages: Firstly, the removal of a layer reduces the thickness of the system, which leads to improved transmission and, thus, to higher brightness in the display of two- or three-dimensional images. Secondly, the elimination of an interface, at which optical transitions regularly cause volume scattering, considerably improves contrast—both image contrast that is decisive for two-dimensional display, and stereoscopic contrast that is decisive for three-dimensional display and influences channel separation.

After its development and fixation, the photographic emulsion layer, actually a gelatin layer, shows pores or openings on its surface, by which the adhesive may penetrate into the photographic emulsion layer. If the adhesive penetrates too deeply into the pores, this may leave not enough of the adhesive on the surface, which may lead to impaired adhesion as well as to the inclusion of air bubbles. Therefore, in a preferred embodiment of the method, a liquid is applied onto the photographic emulsion layer that enters into pores or openings existing in the photographic emulsion layer or on its surface. That liquid must have a composition that causes the pores to be closed at least partially. This is the case if, for example, customary immersion oils or so-called anti-Newton oils are used. The photographic emulsion layer is treated in this way—by being immersed in the liquid or coated with it—before it is brought into contact with the adhesive.

In another embodiment of the method, the photographic emulsion layer can, after removal of the base film, be provided with a protective coat, e.g., of protective varnish, so that the photographic emulsion layer is protected against the action of aggressive liquids or sharp-edged tools. For this purpose, a screen-printing process can be used, for example.

The optical filter structures impressed on the photographic emulsion layer may be so-called barrier filters used for three-dimensional display.

It is understood that, within the scope of the present invention, the features described above and those explained below can be used not only in the combinations stated but also in other combinations or individually.

BRIEF DESCRIPTION OF THE DRAWINGS

Below, the invention will be explained by an example and with reference to the accompanying drawings.

DETAILED DESCRIPTION

Figure 1:
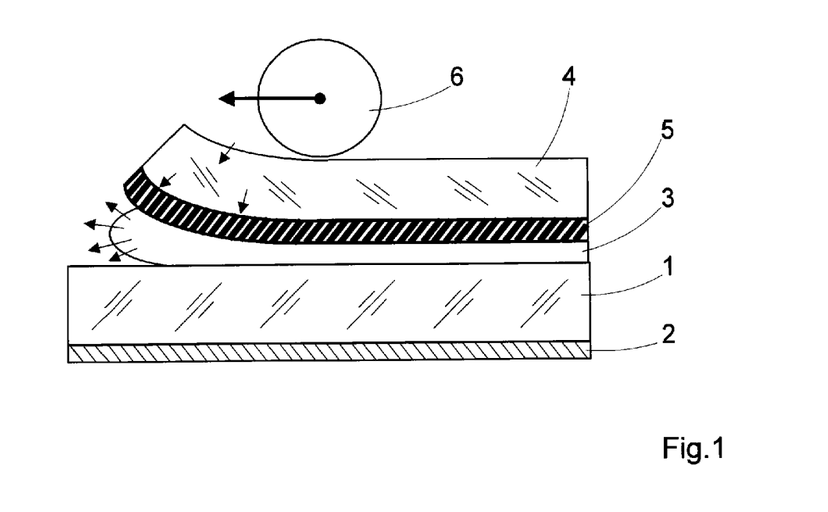
FIG. 1 illustrates how a photographic film may be applied onto a substrate, according to an embodiment of the invention.

Described below are methods with which optical filter structures—for example, barrier filters for three-dimensional display—may be applied onto a substrate transparent to light at least in the visible wavelength range. FIG. 1 illustrates the essential elements that play a part in the process step explained further below. The substrate 1 may be glass, which, as a rule, has the form of a planar, rectangular solid. Here, the bottom side of substrate 1 is provided with an antireflection coating 2; this coating is, however, not absolutely necessary but is only provided for comfortable viewing. An adhesive 3 is applied onto the top side of substrate 1. The adhesive 3 may be a viscous adhesive consisting of monomers, which polymerize and cure under irradiation with ultraviolet light.

Figure 2A:
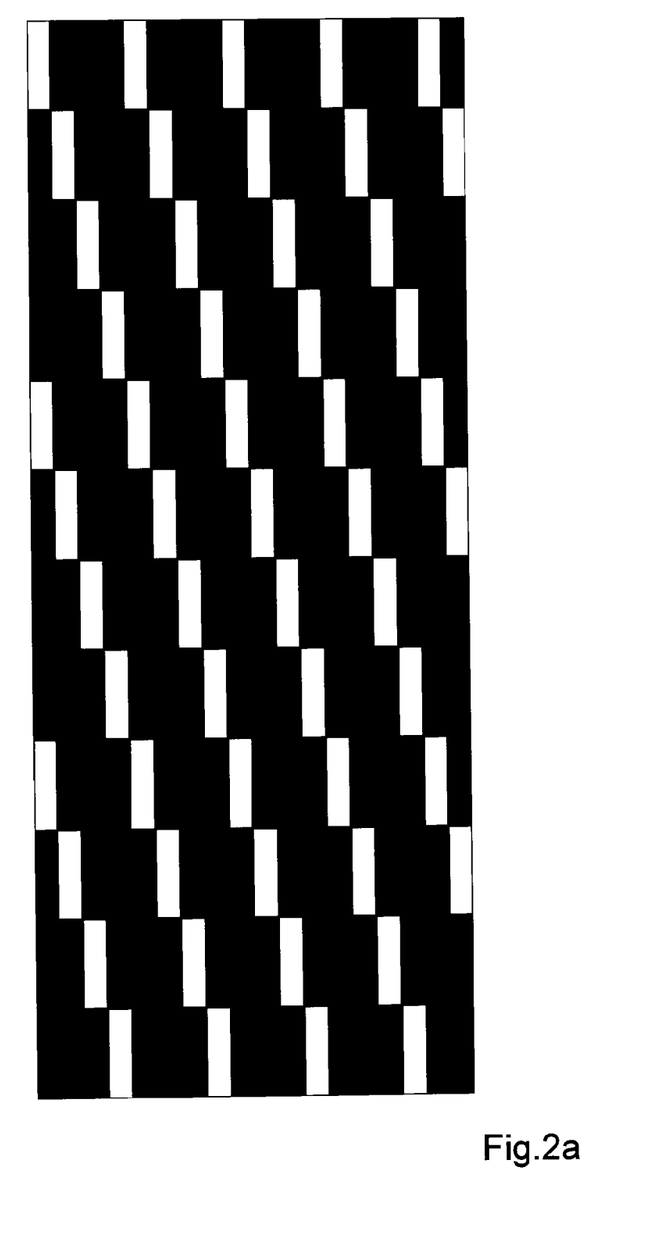
FIG. 2 shows an optical filter structure, according to an embodiment of the invention.
Figure 2B:
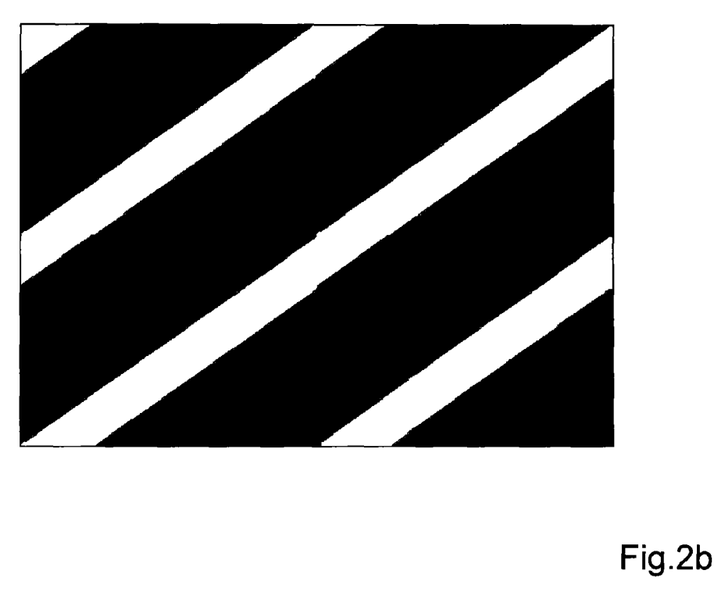
Figure 2C:
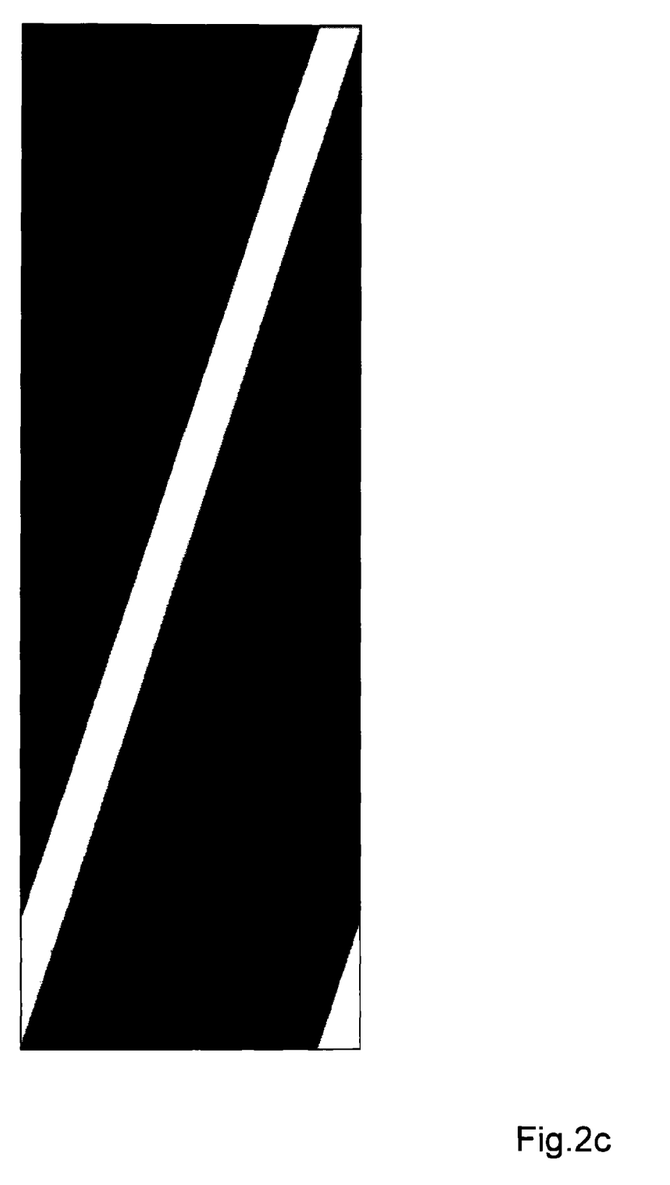

In the process step illustrated in FIG. 1, a photographic film comprising a base film 4 and a photographic emulsion layer 5 applied on the base film is brought into contact with the adhesive 3 so that the film side bearing the photographic emulsion layer 5 contacts the adhesive. The optical filter structures have been impressed in the photographic emulsion layer 5 by exposure to light, development and fixation. This can be achieved by exposure through a suitable mask, which is thus imaged onto the film. Examples of such optical filter structures are shown in FIG. 2*a*)-c). The optical filter structure consists of opaque—black—filter elements and transparent—white—filter elements arranged at regular distances.

Before the photographic emulsion layer is brought into contact with the adhesive, a liquid may be applied onto the photographic emulsion layer or, strictly speaking, onto its surface; this liquid penetrates into any pores or openings existing in the photographic emulsion layer and closes them at least partially. In this way, the adhesive is prevented from entering the pores too deeply, which has advantages for further processing. The liquid may, for example, be some immersion oil.

The adhesive 3 is then spread between film and substrate 1 in such a way that the film is pressed against substrate 1 by rolling a roller 6 across the film at a specified contact pressure and a specified feed rate of roller 6. The contact pressure must not be as high as to overstretch the base film, which can lead to changes of the filter structure that may make the filter unserviceable, because if the distances of the transparent filter elements shown in FIG. 2 differ, the effect of three-dimensional visibility without viewing aids will considerably impaired. Preferably, therefore, the contact pressure is in a range between 1 and 20 kPa, depending on the ambient temperature and the viscosity of the adhesive 3. Taking these two parameters into account, the feed rate is selected to match the selected pressure; usually it is in a range between 0.5 and 20 mm/s if the ambient temperature equals the normal room temperature. At other temperatures, the feed rates and/or pressures may be higher or still lower.

The pressure must not be too low either, though, or else the adhesive 3 would not be sufficiently spread over the substrate 1. Ultimately, after rolling out, the thickness of the layer of adhesive 3 should be approximately between 10 µm and 30 µm.

Figure 3:
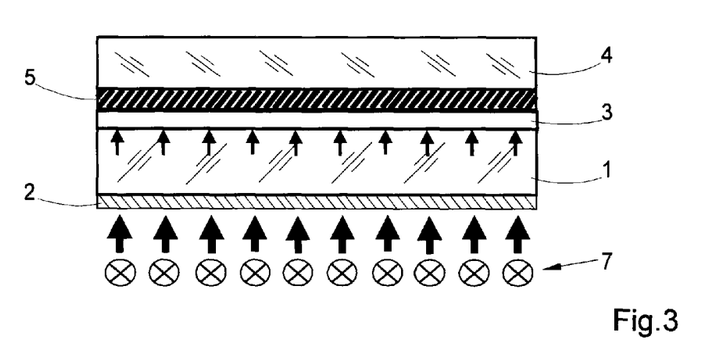
FIG. 3 illustrates the curing of an adhesive applied between substrate and film, according to an embodiment of the invention.

In the next step, a permanent joint between substrate 1 and photographic emulsion layer 5 is established by curing the adhesive 3. If, for example, the adhesive 3 is a monomer curing under the action of ultraviolet light, the layer of adhesive 3, as shown in FIG. 3, can be cured by irradiation with light from UV light sources 7. The necessary exposure time depends on the thickness of the adhesive layer, but also on the temperature (which ideally is 22° C. and should not fall markedly below 10° C.), the illuminance of the UV light, the thickness of the substrate 1 and its absorptive capacity in the ultraviolet region. If the substrate 1 is, for example, float glass of 6 mm thickness, the exposure time at room temperature is approximately 30 s.

Now the joined system with the optical filter structures, made in this way, is already useable, in case time and cost saving are of the essence. However, the base film 4—another, unnecessary layer for the light to penetrate, with a negative effect on brightness—need not necessarily remain on the photographic emulsion layer 5. In another, optional step, therefore, the base film 4 is thermally separated and removed from the photographic emulsion layer 5. For this purpose, the base film 4 must be heated to a level permitting the photographic emulsion layer 5 to detach from it. Care must be taken, though, that the base film 4 is not heated up too much, as then also the photographic emulsion layer 5 would get heated throughout. The consequence could be that, in the attempt to remove the base film 4, the photographic emulsion layer 5 would be destroyed. For example, excessive heating could result in the photographic emulsion layer 5 detaching also from the layer of adhesive 3, on which only some residues would remain.

Figure 4:
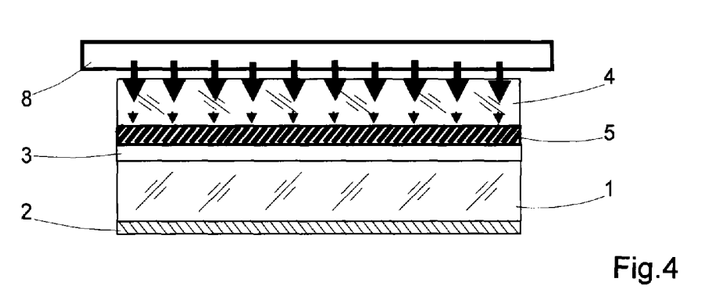
FIG. 4 illustrates the process of heating a base film by means of a hotplate, according to an embodiment of the invention.
Figure 5:
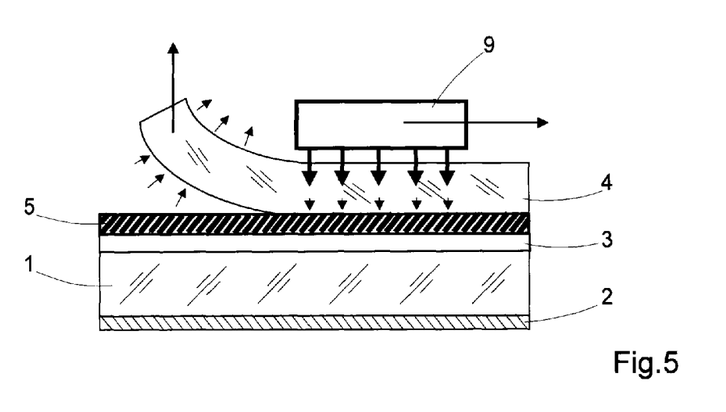
FIG. 5 illustrates the process of heating the base film by means of a movable heating rail, according to an embodiment of the invention.

Two procedures permitting successful separation of base film 4 and photographic emulsion layer 5 are illustrated in FIGS. 4 and 5.

FIG. 4 illustrates how the entire area of base film 4 is heated by means of a hotplate 8. The hotplate 8 radiates heat down towards the base film 4, as indicated by the bold, downward-pointing arrows. The distance of the hotplate and its temperature, as well as the duration of heating, are selected as a function of the thickness of the base film 4 so that the base film 4 itself is heated sufficiently, whereas the photographic emulsion layer 5 adhering to it below, may, at most, heat up in a very thin zone close to the surface so that its elastic state caused by the heating does not lead to any rupture of the photographic emulsion layer itself. This is indicated by the small arrows pointing at the surface of the photographic emulsion layer 5.

Another way, by which heating can be yet better controlled, is illustrated in FIG. 5. Here, for the thermal separation of base film 4 and photographic emulsion layer 5, a heating means, designed as a heating rail 9 with an area that radiates heat towards the base film 4, is moved across the base film 4 at a specified distance and a specified speed. Instead of a heating rail, a heating wire or similar heating means may be used; and instead of moving the heating means past the base film, it is just as well possible to move the joined system past a stationary heating rail 9. It is only important that a relative movement takes place between base film 4 and heating rail 9, as shown in FIG. 5 and indicated by the arrow pointing from the heating rail 9 to the right. Here again, the feed rate is selected as a function of the parameters mentioned above, so that the base film 4 is heated, whereas the photographic emulsion layer 5 below it is heated, at most, in a thin zone close to the surface. By controlling the speed, provided that all other conditions are constant, one can set an optimum temperature regime in a simple manner, so that, immediately after the heating rail 9 has passed a particular position on the base film 4, the base film 4 can be stripped off behind the heating rail 9 by pulling upwards, as indicated by the arrow pointing vertically upwards from the base film 4.

As a result, one obtains an optical filter on glass, for example, a barrier filter for three-dimensional display, without the cold laminating sheet used in prior art, and without the base film 4 bonded to it. In the end, the substrate 1 bears only a thin, firmly cured adhesive coating having a thickness between approx. 10 μm and 30 μm, to which adheres the photographic emulsion layer 5 with the optical filter structures impressed on it. This adherence to the cured adhesive 3 comes at least equal to the adherence that existed before between the photographic emulsion layer 5 and the base film 4. It is, in any case, wiping- and scratch-proof, as long as no sharp-edged objects are used against the photographic emulsion layer 5. If, after removal of the base film 4, the photographic emulsion layer 5 is provided with a specific protective layer, e.g., a special coat varnish, which may be applied by a screen printing process, the filter structure can even be protected against the influence of sharp edges or aggressive liquids.

The optical filters thus fabricated can be divided, e.g., by means of glass cutters, with substantially greater ease and reliability than this is possible in prior art. The risk of breakage and injury is thus considerably reduced. Moreover, with the base film removed, contrast is substantially improved, both for two- and three-dimensional display.

What is claimed is:

1. A method by which optical filter structures are applied onto a substrate transparent to light at least in the visible wavelength range, comprising:
    applying an adhesive onto the substrate;
    contacting a photographic film comprising a base film and a photographic emulsion layer applied on it and with the optical filter structures impressed in the photographic emulsion layer by exposure, development and fixation, with the adhesive so that the adhesive contacts a side of the film bearing the photographic emulsion layer;
    rolling a roller across the film at a specified contact pressure and a specified feed rate of the roller thereby spreading the adhesive between the film and the substrate such that the film is pressed towards the substrate;
    establishing a permanent joint between substrate and photographic emulsion layer by curing the adhesive.

2. A method as claimed in claim 1, further comprising thermally separating and removing the base film from the photographic emulsion layer after the curing.

3. A method as claimed in claim 2, further comprising separating the base film from the photographic emulsion layer, by moving a heating source that radiates heat towards the base film across the base film at a specified distance from the base film and at a specified speed.

4. A method as claimed in claim 2, further comprising providing the photographic emulsion layer with a protective coating after the removal of the base film.

5. A method as claimed in claim 1, further comprising providing the roller at a feed rate between 0.5 and 20 mm/s.

6. A method as claimed in claim 1, further comprising providing a contact pressure between 1 and 20 kPa.

7. A method as claimed in claim 1, further comprising applying a liquid onto the photographic emulsion layer for penetrating into any pores and openings existing in the photographic emulsion layer for at least partially closing said any pores and openings, before the photographic film is brought into contact with the adhesive.

8. A method as claimed in claim 7, further comprising selecting an immersion oil for the liquid.

9. A method as claimed in claim 1, further comprising selecting an adhesive that cures under irradiation with UV light.

10. A method as claimed in claim 1, further comprising curing the adhesive with UV light.

11. A method as claimed in claim 1, further comprising selecting the optical filter structures to be a barrier filter for three-dimensional display.

12. A method as claimed in claim 1, further comprising selecting specified feed rate such that any air trapped in the adhesive can diffuse to the surface ahead of roller or progression of the roller across the film.

13. A method of applying optical filter structure to a substrate:
- applying a flowable adhesive onto a substrate, the substrate transparent to light in the visible wavelength range, the substrate being one of a glass or a polymer;
- arranging a photographic film that has a base layer and a photographic emulsion layer with a barrier filter as an optical image fixed in the emulsion layer such that the base layer faces away from the substrate;
- commencing a contact of the photographic film with the spreadable adhesive on the substrate with the base layer facing away from the substrate;
- progressively engaging the photographic film with substrate across the substrate with the adhesive therebetween by one of rolling a roller and sliding a slider across the photographic film at a feed rate sufficient to allow air bubbles in the adhesive to diffuse to the surface and disappear.

14. A method as claimed in claim 13, further comprising curing of the adhesive with UV light thereby providing for permanent adhesion between the file and substrate.

15. A method as claimed in claim 13, further comprising selecting a feed rate and pressure such that there is a greater adhesive thickness forward of the roller compared to behind the one of a roller and a slider and such that the thickness of the adhesive between the photographic film and substrate is between 10 µm and 30 µm.

16. A method as claimed in claim 13, further comprising allowing the adhesive to spread out ahead of the one of a roller and slider and ahead of where the adhesive and photographic layer are progressively contacting as the one of a roller and slider is rolled across the photographic film.

17. A method as claimed in claim 13, further comprising progressively removing the base layer from the photographic emulsion layer across the substrate by progressively applying radiant heat across the substrate.

18. A method of applying optical filter structure to a substrate:
- applying a spreadable adhesive onto a substrate, the substrate transparent to light in the visible wavelength range, the substrate being one of a glass and a polymer;
- arranging a photographic film that has a base layer and a photographic emulsion layer with a barrier filter as an optical image fixed in the emulsion layer such that the base layer faces away from the substrate;
- commencing a contact of the photographic film with the spreadable adhesive on the substrate with the base layer facing away from the substrate;
- progressively engaging the photographic film with the spreadable adhesive across the substrate by one of rolling a roller and sliding a slider across the photographic film at a pressure and feed rate such that the adhesive spreads ahead of the one of a roller and slider and ahead of where the adhesive and photographic layer are engaged as the one of a roller and slider is one of rolled and slid across the photographic film.

19. A method as claimed in claim 17, further comprising selecting at least one of the feed rate and pressure whereby air bubbles in the adhesive may diffuse to the surface and disappear.

20. A method as claimed in claim 13, further comprising progressively removing the base layer from the photographic emulsion layer across the substrate by progressively applying radiant heat across the substrate and then applying a protective coating over the photographic emulsion layer.

\* \* \* \* \*